E. B. CAMPBELL.
PACKING RING.
APPLICATION FILED JULY 1, 1914.

1,132,762. Patented Mar. 23, 1915.

Attest:
Wm. H. Scott.
N. G. Butler.

Inventor:
Edward B. Campbell,
Rippey & Kingsland,
Attys.

UNITED STATES PATENT OFFICE.

EDWARD B. CAMPBELL, OF ST. LOUIS, MISSOURI.

PACKING-RING.

1,132,762. Specification of Letters Patent. Patented Mar. 23, 1915.

Application filed July 6, 1914. Serial No. 849,329.

*To all whom it may concern:*

Be it known that I, EDWARD B. CAMPBELL, a citizen of the United States, residing in the city of St. Louis and State of Missouri, have invented a new and useful Packing-Ring, of which the following is a specification.

This invention relates to packing rings of the type used in connection with reciprocating pistons, and it consists of an open ring of the elastic or expansion type adapted to encircle the piston and be seated within a circumferential groove therein so as to expand against the interior surface of the cylinder.

An object of the invention is to produce a packing ring comprising a resilient, open ring, the adjacent ends of which are provided with overlapping extensions which are received in corresponding recesses in the ring, thus forming a close connection which prevents the passage of the gas or steam, or the products of combustion, from one end of the piston to the other.

Another object is to produce a resilient packing ring of the open type, the annulus of which is substantially rectangular in cross section and each end of which is provided with two noncommunicating notches or recesses and with two reduced extensions, the extensions on one end of the open ring being seated within the notches or recesses on the opposite end thereof, so that when the ring is seated on the piston and within the cylinder a substantially hermetic joint is formed.

Figure 1:
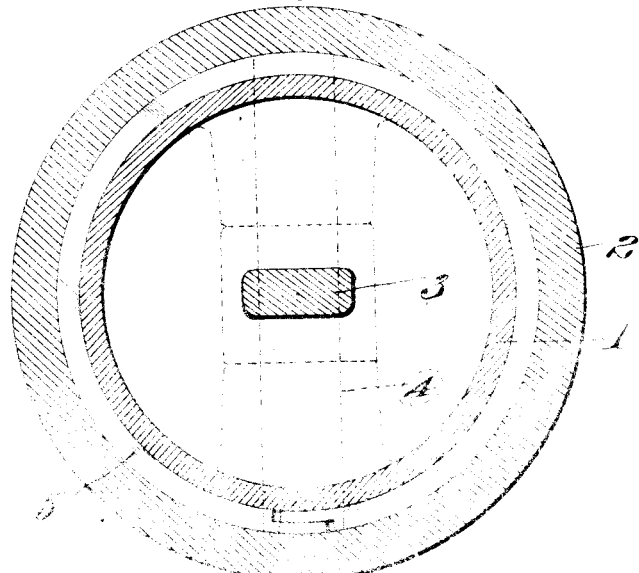
Figure 2:
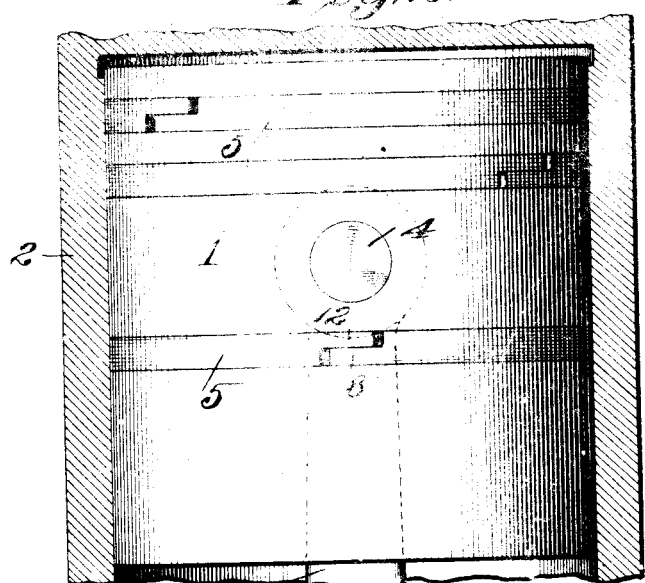
Figure 3:
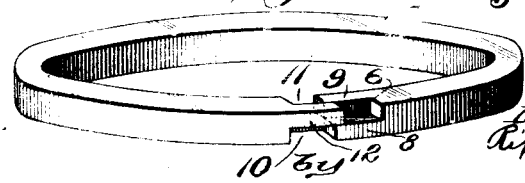
Figures 4, 5:

In the accompanying drawings in which I have illustrated one embodiment of my invention, Figure 1 is a cross sectional view of a piston and a cylinder showing my improved packing ring in combination therewith. Fig. 2 is a longitudinal sectional view of the cylinder showing the piston with the packing rings mounted thereon within the cylinder. Fig. 3 is a perspective view of the packing ring detached from the piston. Figs. 4 and 5 are detail views illustrating the formation of the overlapping end parts of the ring.

The reciprocating piston 1 is of usual construction and operates within the usual cylinder 2, power being transmitted from the piston by means of a piston rod 3. The piston rod 3 is connected to the piston by well known pivot connection 4.

As usual, a number of circumferential grooves or channels are formed in the periphery of the piston 1 and within these grooves or channels the packing rings are mounted. The construction and arrangement of the packing rings are clearly illustrated in Figs. 3, 4 and 5, in which it will be seen that each ring consists of an open ring member 5, the annulus of which is substantially rectangular in cross section and which is adapted to be received in any of the circumferential grooves or channels formed in the piston.

Preferably each ring is originally cut from a cylinder having a diameter slightly in excess of the interior diameter of the cylinder within which the ring is to operate so that the natural resiliency of the ring will cause it to expand to the full extent permitted by the cylinder within which it is operating, thus forming a very close and substantially hermetic connection.

One end of the ring is provided with a notch or recess 6 at one of the outer corners thereof and with a similar notch or recess 7 at the inner corner diagonally opposite from the outer recess. The formation of the notches or recesses 6 and 7 leaves two projecting tongues or extensions 8, preferably forming close connection at their adjacent corners, as indicated at 9 (Fig. 5) so that there is no communication between the notches or recesses 6 and 7. The adjacent end of the ring is also provided with a notch or recess 10 of the same size as and adapted to receive the outer tongue or projection 8 on the adjacent end of the ring. Also this end of the ring is provided with an inner notch or recess 11 which is of the same size as and which is adapted to receive the inner tongue or projection of the adjacent end of the ring.

The two tongues or projections 12, created by the formation of the notches or recesses 10 and 11, match and fit closely within the notches or recesses 6 and 7 when the ring is seated in its final position upon the piston.

As mentioned in describing the arrangement of the recsses 6 and 7, it is preferable that said recesses and the separate tongues or projections be so formed that there shall be no communication between the inner and outer recesses, thus preventing the passage of any of the gas or steam from the explosion chamber in the cylinder. It is preferable that the tongues or projections shall overlap a distance considerably in excess of the greatest expansion of the ring when mounted within the cylinder, so that there will always be a close connection formed by the overlapping tongues thereby preventing the passage of the gas or steam.

Whether the ring be produced from a single member in which the overlapping tongues or projections are formed, or from rigidly or integrally united rings, is immaterial since the resulting structure is substantially the same. Therefore, I do not restrict myself to any specific manner of producing the ring. It will be understood that I contemplate such variations as may be found necessary in order to produce the ring most satisfactorily under varying conditions and that I do not restrict myself to specific features, except where specifically set forth in the appended claims.

What I claim and desire to secure by Letters Patent is:—

1. A packing ring, comprising an open ring, the body of which is substantially rectangular in cross section, two projections of substantially the same length on diagonally opposite corners of one end of said ring and forming two diagonally opposite recesses of substantially the same size, and projections on diagonally opposite corners of the adjacent end of the ring seated in said recesses, substantially as described.

2. A packing ring, comprising an open ring substantially rectangular in cross section, two diagonally opposite projections of substantially the same length on one end of said ring, and two diagonally opposite projections of substantially the same length as said first-named projections on the adjacent end of said ring extending above and below said first-named projections, respectively, substantially as described.

3. A packing ring, comprising a resilient open ring, the body of which is substantially rectangular in cross section, two diagonally opposite non-communicating recesses of substantially equal size formed in one end of said ring, and two diagonally opposite projections of substantially the same size on the opposite end of said ring seated in said recesses and forming substantially hermetic joints.

4. A packing ring, comprising a resilient open ring substantially rectangular in cross section, two diagonally opposite projections on one end of said ring forming two diagonally opposite non-communicating recesses, and two diagonally opposite projections formed on the other end of said ring forming two diagonally opposite non-communicating recesses, said projections being seated in said recesses, respectively.

In witness whereof, I have signed this specification in the presence of two subscribing witnesses.

EDWARD B. CAMPBELL.

Witnesses:
L. C. KINGSLAND,
K. R. McDONALD.